US012745294B2

(12) United States Patent
Agrawal et al.

(10) Patent No.: US 12,745,294 B2
(45) Date of Patent: Sep. 22, 2026

(54) ONBOARDING VIRTUALIZED NETWORK DEVICES TO CLOUD-BASED NETWORK ASSURANCE SYSTEM

(71) Applicant: Juniper Networks, Inc., Sunnyvale, CA (US)

(72) Inventors: Kaushik Adesh Agrawal, Chelmsford, MA (US); Keh-Ming Luoh, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 573 days.

(21) Appl. No.: 17/645,010

(22) Filed: Dec. 17, 2021

(65) Prior Publication Data

US 2022/0346160 A1 Oct. 27, 2022

Related U.S. Application Data

(60) Provisional application No. 63/178,400, filed on Apr. 22, 2021.

(51) Int. Cl.
*H04W 76/10* (2018.01)
*G06F 9/455* (2018.01)
(Continued)

(52) U.S. Cl.
CPC ........ *H04W 76/10* (2018.02); *G06F 9/45558* (2013.01); *H04L 69/22* (2013.01);
(Continued)

(58) Field of Classification Search
CPC ..... H04W 76/10; H04W 12/04; H04W 40/02; H04W 48/18; H04W 60/00; G06F 9/45558; G06F 2009/45595; H04Q 9/00
(Continued)

(56) References Cited

U.S. PATENT DOCUMENTS 9,729,439 B2 8/2017 MeLampy et al.
9,729,682 B2 8/2017 Kumar et al.
(Continued)

FOREIGN PATENT DOCUMENTS

CN 105981443 A 9/2016
WO WO-2018232304 A1 * 12/2018 .......... H04L 63/104

OTHER PUBLICATIONS

U.S. Appl. No. 17/303,222, entitled "Virtual Network Assistant Having Proactive Analytics and Correlation Engine Using Unsupervised ML Model," Juniper Networks, Inc. (inventor: Safavi) filed May 24, 2021.

(Continued)

*Primary Examiner* — Kwang B Yao
*Assistant Examiner* — Bradley D Lytle, Jr.
(74) *Attorney, Agent, or Firm* — Shumaker & Sieffert P.A.

(57) ABSTRACT

Techniques are described for onboarding virtualized network devices to a cloud-based WAN assurance system. For example, a virtualized network device receives, from a network device conductor that manages a plurality of network devices, a registration code for registering with the cloud-based WAN assurance system. In response to receiving the registration code and instructions, the network device sends the registration code to the cloud-based WAN assurance system. The cloud-based WAN assurance system verifies the network device based on the registration code, and assigns a distinct (e.g., unique) device identifier to the network device, and sends the distinct device identifier and a secret key to the network device. The network device uses the secret key to create a new secure connection with the cloud-based WAN assurance system, for streaming telemetry data to the WAN assurance system. The cloud-based
(Continued)

WAN assurance system analyzes the network device telemetry data to provide WAN assurance.

20 Claims, 4 Drawing Sheets

(51) Int. Cl.
*H04L 69/22* (2022.01)
*H04W 12/04* (2021.01)
*H04W 40/02* (2009.01)
*H04W 48/18* (2009.01)
*H04W 60/00* (2009.01)

(52) U.S. Cl.
CPC ........... *H04W 12/04* (2013.01); *H04W 40/02* (2013.01); *H04W 48/18* (2013.01); *H04W 60/00* (2013.01); *G06F 2009/45595* (2013.01)

(58) Field of Classification Search
USPC ......... 370/329; 726/4, 1, 3, 22, 2, 27, 30, 9, 726/12, 15
See application file for complete search history.

(56) References Cited

U.S. PATENT DOCUMENTS 9,762,485 B2 9/2017 Kaplan et al.
9,832,082 B2 11/2017 Dade et al.
9,871,748 B2 1/2018 Gosselin et al.
9,985,883 B2 5/2018 MeLampy et al.
10,200,264 B2 2/2019 Menon et al.
10,277,506 B2 4/2019 Timmons et al.
10,432,522 B2 10/2019 Kaplan et al.
10,958,537 B2 3/2021 Safavi
10,958,585 B2 3/2021 Safavi
10,985,969 B2 4/2021 Safavi
11,165,863 B1 11/2021 Timmons et al.
11,329,912 B2 * 5/2022 Kaplan .................. H04L 45/28
2008/0120707 A1 * 5/2008 Ramia ................ H04L 63/0861 726/5
2016/0197834 A1 * 7/2016 Luft ........................ H04L 12/46 709/223
2017/0222981 A1 * 8/2017 Srivastav ............ H04L 63/0428
2019/0268322 A1 8/2019 Leblond et al.
2020/0145304 A1 5/2020 Wulff et al.
2020/0314022 A1 * 10/2020 Vasseur ............... G06F 18/2185
2020/0366589 A1 11/2020 Kaplan et al.
2020/0366590 A1 11/2020 Kaplan et al.
2020/0366598 A1 11/2020 Kaplan et al.
2020/0366599 A1 11/2020 Kaplan et al.
2021/0044623 A1 * 2/2021 Bosch .................. G06F 21/575
2021/0112034 A1 4/2021 Sundararajan et al.
2022/0100862 A1 * 3/2022 Vetter .................. G06F 21/575

OTHER PUBLICATIONS

Extended Search Report from counterpart European Application No. 22160643.7 dated Aug. 19, 2022, 11 pp.
Anonymous, "Verizon Network Infrastructure Planning SDN-NFV Reference Architecture", Feb. 2016, 220 pp., Retrieved from the Internet on May 15, 2020 from URL: https://m.iotone.com/files/pdf/vendor/Verizon_SDN-NFV_Reference_Architecture.pdf.
Response to Extended Search Report dated Aug. 19, 2022, from counterpart European Application No. 22160643.7 filed Apr. 19, 2023, 30 pp.
Notice of Intent to Grant and Text Intended to Grant from counterpart European Application No. 22160643.7 dated Aug. 2, 2024, 45 pp.
"Verizon Network Infrastructure Planning SDN-NFV Reference Architecture", vol. 1, Verizon, Feb. 2016, 220 pp., URL: https://edwinhernandez.com/wp-content/uploads/2020/04/Verizon-5G-SDN-NFV-small.pdf.
Extended Search Report from counterpart European Application No. 25150540.0 dated May 7, 2025, 7 pp.
Response to Extended Search Report dated May 7, 2025, from counterpart European Application No. 25150540.0 filed Dec. 2, 2025, 23 pp.

* cited by examiner

ONBOARDING VIRTUALIZED NETWORK DEVICES TO CLOUD-BASED NETWORK ASSURANCE SYSTEM

This application claims the benefit of U.S. Provisional Patent Application No. 63/178,400, filed 22 Apr. 2021, the entire contents of which is incorporated herein by reference.

TECHNICAL FIELD

This disclosure generally relates to computer networks and, more specifically, providing network assurance of computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for automatically connecting virtualized network devices to a network management system, such as a cloud-based network assurance system, to monitor network performance and identify network faults. The virtualized network devices may be provided by software executing on one or more virtual machines or containers, or other virtual execution elements. In some examples, the virtualized network devices employ a stateful, session-based routing scheme that enables each network device to independently perform path selection and traffic engineering. The onboarding process described herein works for onboarding both virtualized network devices and hardware-based network devices.

The process of onboarding virtualized network devices to a system for cloud-based network assurance can have some unique challenges in terms of trust model, scalability and widespread adoption. Onboarding network devices that execute in a virtualized environment may result in unique challenges. For example, in contrast to a conventional hardware-based router or switch appliance that has a hardware identifier such as a MAC address assigned during the physical manufacturing process, a virtualized network device does not itself have such a hardware identifier because it is embodied in software executing on a physical network device rather than being a physical network device itself. There may be multiple virtual execution elements executing on a single physical network device, so a hardware identifier of the physical network device upon which the virtualized network device is running would not be unique, and so cannot be used to track the virtualized network device in the cloud-based network assurance system.

The techniques of this disclosure address these challenges by enabling a conductor that instantiates and manages a virtualized network device to provide a registration token to the newly instantiated virtualized network device for use in registering with the cloud-based network assurance system, and instructions to begin the registration process with the cloud-based network assurance system. The techniques allow for leveraging the trusted status of the virtualized network device with the conductor, and enables this trust of the virtualized network device to be extended to the cloud-based network assurance system. The virtualized network device follows the instructions received from the conductor and uses the registration token to automatically self-register with the cloud-based network assurance system. The techniques enable the cloud-based network assurance system to register the virtualized network device and create a unique device identifier that represents the virtualized network device in a back end of the cloud-based network assurance system. This process can be repeated for any number of virtualized network devices, resulting in each one being automatically connected to the cloud-based network assurance system and automatically assigned a unique device identifier by the cloud-based network assurance system.

The techniques of this disclosure provide one or more technical advantages and practical applications. The techniques of the disclosure may enable many virtualized network devices to automatically connect to a network management system, such as provided by a cloud-based wide area network (WAN) assurance system, without manual user intervention per network device. The network management system may include a virtual network assistant to execute a proactive analytics and correlation engine configured to dynamically construct and apply an unsupervised machine learning-based ("ML-based") model for network reducing or minimizing resources expended on network diagnostics. In some examples, the proactive analytics and correlation engine may apply a ML-based model to collected network event data to provide WAN assurance, such as by predicting or identifying underlying faults in the network system. The WAN assurance services provided by the network management system are especially powerful in the context of software-based session-aware routers, because this allows aspects of application-aware and tenant-aware network insights to be incorporated into the cloud-based WAN assurance system.

In one example aspect, a method includes automatically registering, by each of a plurality of virtualized network devices of a Wide Area Network (WAN), with a cloud-based WAN assurance system using a registration code received by each of the plurality of virtualized network devices from a conductor that created the plurality of virtualized network devices, wherein the conductor is external to the cloud-based WAN assurance system; and sending, by each of the plurality of virtualized network devices and subsequent to the registering, telemetry data to the cloud-based WAN assurance system.

In another example aspect, a method includes in response to receiving corresponding device identification data from each of a plurality of virtualized network devices, generating, by a cloud-based Wide Area Network (WAN) assurance system, a distinct device identifier for each of the plurality of virtualized network devices; adding, by the cloud-based WAN assurance system, a corresponding entry for each of the virtualized network devices into a device database, wherein each of the corresponding entries includes the corresponding distinct device identifier; and sending, by the cloud-based WAN assurance system and to each of the virtualized network devices, a different corresponding distinct identifier for the respective virtualized network device and a different corresponding distinct cryptographic key for use in sending telemetry data to the cloud-based WAN assurance system.

In a further example aspect, a system includes processing circuitry for a virtualized network device; and memory operably coupled to the processing circuitry and that includes instructions configured to cause the processing circuitry to: automatically register, by a virtualized network device of a plurality of virtualized network devices of a WAN, with a cloud-based WAN assurance system using a registration code received by the virtualized network device from a conductor that created the virtualized network device, wherein the conductor is external to the cloud-based WAN assurance system; and send, subsequent to the registering and to the cloud-based WAN assurance system, telemetry data obtained by the virtualized network device.

In another example aspect, a method includes receiving, by a network device conductor for a plurality of virtualized network devices configured to perform session-based routing, a registration code generated by a cloud-based WAN assurance system and comprising an organization identifier; instantiating, by the network device conductor, a first virtualized network device of the plurality of virtualized network devices, wherein the first virtualized network device is configured to perform session-based routing; sending, by the network device conductor and to the first virtualized network device, the registration code; sending, by the first virtualized network device and to the cloud-based WAN assurance system, device identification data comprising the organization identifier, an identifier for the network device conductor, an identifier for a physical device executing the virtualized network device, and a name for the virtualized network device. The method also includes in response to receiving the device identification data from the first virtualized network device: adding, by the cloud-based WAN assurance system, an entry for the first virtualized network device into a device database; sending, by the cloud-based WAN assurance system and to the first virtualized network device via the first connection, a distinct identifier for the first virtualized network device and a cryptographic key; storing, by the first virtualized network device, the distinct identifier for the first virtualized network device and the cryptographic key; and sending, by the first virtualized network device and to the cloud-based WAN assurance system via a second connection to the cloud-based WAN assurance system established using the second cryptographic key, telemetry data for the first virtualized network device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
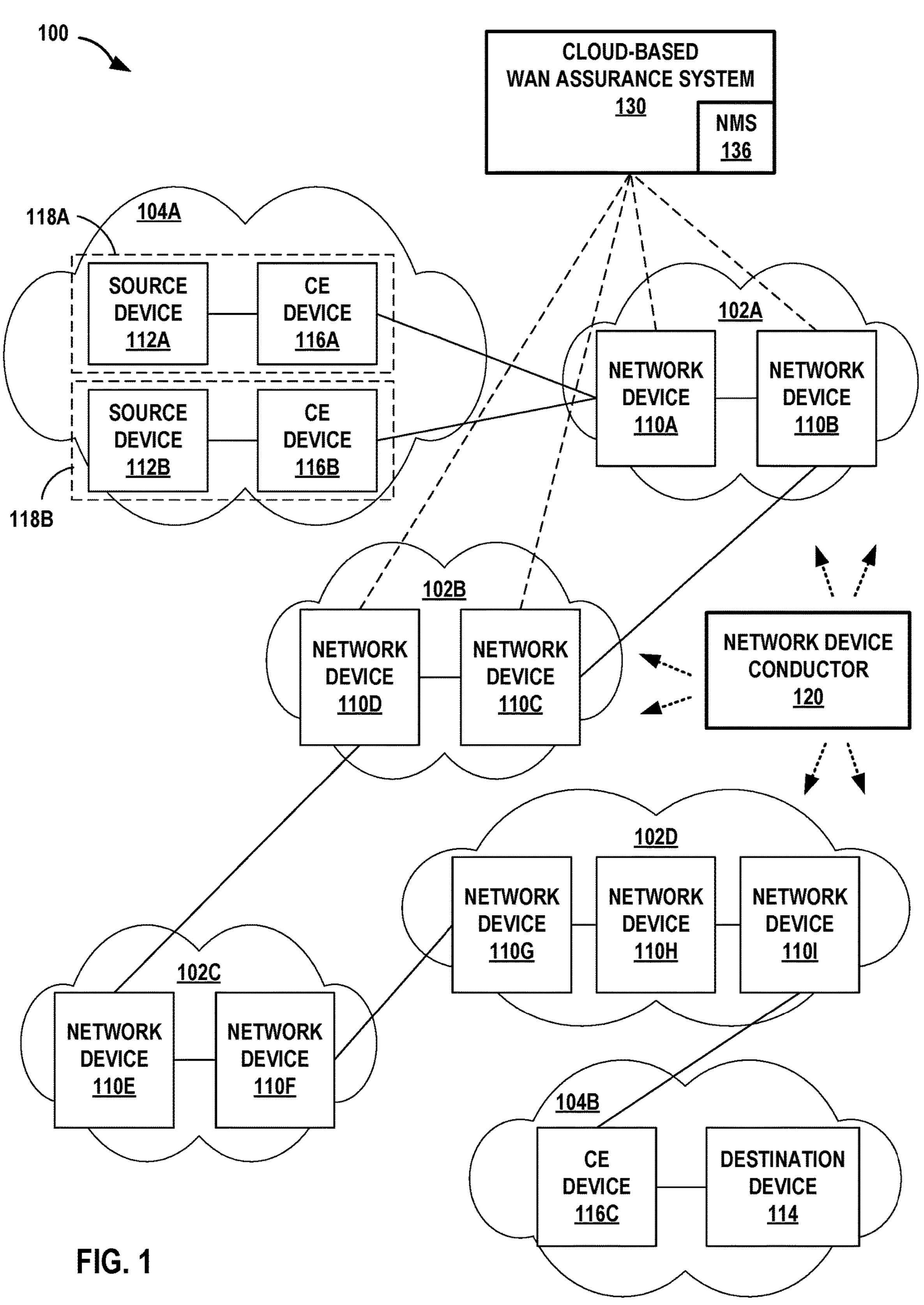
FIG. 1 is a block diagram illustrating an example computer network system in accordance with the techniques of the disclosure.

FIG. 1 is a block diagram illustrating example computer network system 100 in accordance with the techniques of the disclosure. In the example of FIG. 1, computer network system 100 includes networks 102A-102D (collectively, "networks 102") configured to provide Wide Area Network (WAN) connectivity to different customer networks 104A-104B ("customer networks 104"). In some examples, networks 102 are service provider networks. Although in the example of FIG. 1, computer network system 100 is illustrated as including multiple interconnected networks 102, in other examples computer network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 are provided by cloud-based WAN assurance system 130 only. Cloud-based WAN assurance system 130 provides WAN assurance services to networks 102. Cloud-based WAN assurance system 130 includes network management system (NMS) 136 which may provide machine-learning based analytics of data collected by Cloud-based WAN assurance system 130.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of an enterprise, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1. The configuration of computer network system 100 illustrated in FIG. 1 is merely an example. For example, computer network system 100 may include any number of customer networks 104. Nonetheless, for ease of description, only customer networks 104A-104B are illustrated in FIG. 1.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, computer network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of computer network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, network devices 110 employ a stateful, session-based routing scheme that enables each network device 110 to independently perform path selection and traffic engineering. In some examples, network devices 110 are session aware SD-WAN routers. The use of session-based routing may enable network devices 110 to eschew the use of a centralized controller, such as a Software-Defined Networking (SDN) controller to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc.

As described herein, a network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table.

If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019;

and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Tenant-Based Routing

Computer network system 100 may provide network services to one or more tenants. A "tenant" in this example is a source of network traffic and consumes the network services provided by a computer network. Typically, a tenant is the entity that originates a network session associated with a network service. A tenant, as described herein, may be considered to be broader than merely a customer or enterprise that is logically isolated from other customers or enterprises within a virtual networking model. Tenants typically are considered to be global in nature. A tenant may be considered to be one or more entities to which a policy may be applied. In some examples, a tenant is defined as having a hierarchical scope such that one or more entities may be grouped hierarchically such that a policy may be applied to the group. In some examples, a tenant is defined as a network interface, the network interface being an object or entity to which a policy may be applied. In some examples, a tenant is defined as an Internet Protocol (IP) address or a block of IP addresses to which a policy may be applied. Such policies may include security policies which specify which tenants may access a network service. Further, such policies may include SLAs that define how tenants may access the network service. The "tenant" concept may be useful where writing security policies based on IP addresses alone may be insufficient, e.g., for mobile users and/or fuzzy edge networks. In some examples, a tenant is classified by assigning a tenant to a network interface such that network traffic originating from the interface is classified as belonging to the assigned tenant. In some examples, a tenant is classified by assigning a tenant to one or more prefixes (e.g., an IP address prefix).

For example, as depicted in FIG. 1, computer network system 100 may classify a first interface of network device 110A over which network device 110A receives network traffic from source device 112A and CE device 116A as belonging to tenant 118A. Computer network system 100 may classify a second interface of network device 110A over which network device 110A receives network traffic from source device 112B and CE device 116B as belonging to tenant 118B.

In some examples, tenants are organized into a hierarchical model. For example, each tenant may include one or more subtenants. This may enable computer network system 100 to apply policies in a hierarchical fashion such that a policy may be applied to a particular tenant, as well as each of its subtenants. Furthermore, different policies may be applied to different subtenants of the same tenant. In some examples, each subtenant may have sub-subtenants of its own, and so on.

In accordance with the techniques of the disclosure, computer network system 100 implements techniques for automatically connecting virtualized network devices to network management system 136 of cloud-based WAN assurance system 130, to monitor network performance and identify network faults.

One or more of network devices 110 may be Session Smart Routers that are based on a software-only model, which makes them platform agnostic by nature. This poses a challenge as the entity providing the cloud-based WAN assurance system does not have direct control over the manufacturing process of network devices 110. A trust model needs to be established between network devices 110 and the cloud-based WAN assurance system 130 to enable the process of onboarding network devices 110 into cloud-based WAN assurance system 130.

The scale of existing deployments is in the order of tens of thousands and offer a huge opportunity to enable WAN Assurance on those deployments. This makes ease of use very crucial for the onboarding process.

The techniques of this disclosure address these challenges by enabling network device conductor 120 to provide a registration token to a newly instantiated virtualized network device, such as one of network devices 110, for use in registering with cloud-based WAN assurance system 130. Network device conductor 120 also provides the network device 110 with instructions to begin the registration process with cloud-based WAN assurance system 130. The techniques allow for leveraging the trusted status of the virtualized network device 110 with network device conductor 120, and enables this trust of the virtualized network device 110 to be extended to cloud-based WAN assurance system 130. Virtualized network device 110 follows the instructions received from the conductor and uses the registration token to automatically self-register with the cloud-based network assurance system. Using the registration token can avoid a "man-in-the-middle" security issue.

The techniques enable cloud-based WAN assurance system 130 to register each virtualized network device 110 and create a unique device identifier that represents the virtualized network device 110 in a back end of the cloud-based network assurance system. The unique device identifier is used internally by cloud-based WAN assurance system 130, and is different than a user-facing device name visible in a portal of cloud-based WAN assurance system 130. This process can be repeated for any number of virtualized network devices 110, resulting in each one being automatically connected to cloud-based WAN assurance system 130 and automatically assigned a unique device identifier by cloud-based WAN assurance system 130. For example, the cloud-based WAN assurance system can use telemetry data from the virtualized network device 110 to set, monitor and enforce service levels across the WAN. The cloud-based WAN assurance system may detect anomalies and provide visibility into WAN conditions that could affect people and devices using the network.

WAN assurance of networks 102 may provide the following advantages:

- Visibility into WAN user experience with application-based context.
- End-to-end impact analysis to user based on wireless, wired, WAN telemetry, states, and events.
- Automatic corrections and identification for gateway misconfigurations and faulty interfaces.
- Insight into Session Smart Router and gateway telemetry, along with WAN link health.

The techniques of this disclosure provide a platform-agnostic onboarding mechanism. The onboarding mechanism is "platform-agnostic" in that it that works the same way for hardware-based appliances and virtual-based appliances. For example, one or more of network devices 110 may be hardware-based appliances while others of network devices 110 may be virtual-based appliances, but the same techniques can be used for all of network devices 110.

The techniques of this disclosure allow for trust to be established between existing and new virtual-based appliance deployments and the cloud back end. The techniques of this disclosure automate the process by which a virtualized network device is "manufactured" in the cloud back-end system as part of the onboarding process, and also create a permanent unique identifier for the virtualized network device, which can then be used for management and monitoring of the virtualized network device by the cloud-based WAN assurance system.

In some examples, cloud-based WAN assurance system 130 may also monitor one or more wireless networks. In this manner, a single network management system 136 can be used for monitoring and/or management of both wireless networks and networks containing virtualized network devices 110 (e.g., software-based routers running on a virtual machine or container), for an end-to-end WAN assurance system viewable via a single cloud-based WAN assurance portal.

The techniques of this disclosure are useful in a brownfield deployment, which is helpful where cloud-based WAN assurance system 130 is managed by an entity that does not also have absolute control over the manufacturing process of the network devices 110. E.g., network devices 110 may be virtual devices created on network devices from any vendor. In this manner, the administrator does not have to manually, or through APIs, create entries for tens of thousands of the individual routers on the cloud-based WAN assurance system portal, which makes for a better user experience. The techniques of this disclosure may decrease the burden on the user and automate the registration process for the user.

The techniques described herein are platform-agnostic (in addition to being hardware-agnostic). The techniques can be used for onboarding virtual routers executing on virtual machines, containers, and other virtual execution elements, which have no hardware identifiers. Virtual routers can self-onboard with cloud-based WAN assurance system 130. The techniques allow the system to establish trust automatically, while being security aware. Once the virtual router is "manufactured" in the cloud, the virtual network device is assigned with a permanent device ID for monitoring, configuration, or other purposes.

Network device conductor 120 may be a server that executes conductor software for managing network devices 110. In some examples, network device conductor 120 also provides network analytics for network devices 110. However, in large network systems with many thousands of routers, the usefulness of network device conductor 120 may be reduced due to the very large amounts of data and multiple instances of a conductor needed. These issues can be resolved by leveraging the cloud-based WAN assurance system infrastructure to perform WAN assurance for networks 102. Having cloud scale for a centralized management plane, as well as artificial intelligence and machine learning can make networks of routers as easy to run as large numbers of access points. Moreover, combining artificial intelligence-based analytics with network devices 110 having session awareness can extend cloud-based WAN assurance system 130 awareness of network relationships down to the user/application level, a level where productivity tuning is critical.

With Routers, Switches, Firewalls, Wireless Networks, and SD-WAN solutions combined, a complete branch edge to cloud networking infrastructure is possible with a single point of management and control from cloud-based WAN assurance system 130. This provides a single solution for the WAN network with one management plane. The combination of the technologies provides many options for service creation and automation, not only for enterprises, but also for service providers and managed-service providers.

Figure 2:
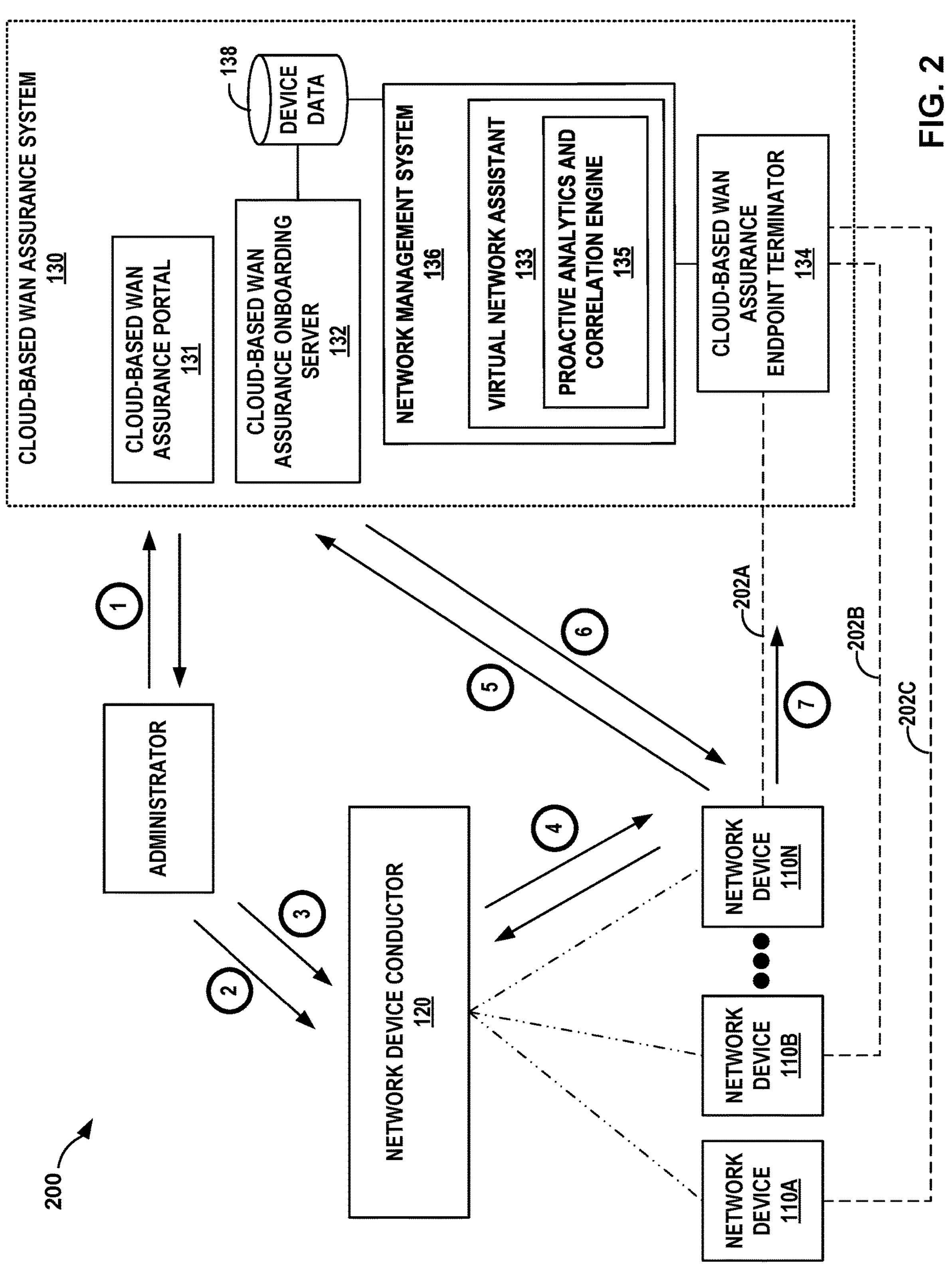
FIG. 2 is a block diagram illustrating another example computer network system in accordance with the techniques of the disclosure.

FIG. 2 is a block diagram illustrating another example computer network computer network system 200 configured to onboard network device 110N to cloud-based WAN assurance system 130 in accordance with the techniques of the disclosure. Cloud-based WAN assurance system 130 is a cloud-based microservices system. In some examples, network device 110N is an example of one of network devices 110A-110N of FIG. 1. While the example of FIG. 2 depicts an operation to onboard network device 110N, the operation depicted in FIG. 2 may be applied to any of network devices 110A-110I of FIG. 1 or network devices 110A-110N of FIG. 2.

Cloud-based WAN assurance system 130 provides a cloud service that brings automated operations and service levels to the enterprise access layer for the WAN edge, and when used in conjunction with Wired and Wireless Assurance, transforms all operations covering the switches, IoT devices, access points, servers, printers, etc. Gateways provide rich streaming telemetry data that enable the insights for gateway health metrics and anomaly detection. After network devices 110 are onboarded into cloud-based WAN assurance system 130 (as described in more detail below), network devices 110 provide streaming telemetry data to cloud-based WAN assurance system 130 via sessions 202A-202C.

In some examples, the telemetry data includes data relating to application response times and WAN link and gateway health measurements. For Gateway health, data can include, for example, CPU utilization, memory utilization, link utilization, temperature, fan, power. For WAN link health, data can include, for example, IPSec information, Routing Protocols information, and WAN interface information. Application experience information can include, for example, latency, jitter, packet loss, roundtrip times, and other metrics, on a per-application basis.

WAN insights driven by AI: For physical network devices, the WAN insights show exactly how network devices are performing with detailed network device metrics and insights down to the port level such as CPU, memory utilization, bytes transferred, traffic utilization, and power draw. WAN Assurance also logs network device events, like configuration changes and system alerts. Along with WAN utilization, IPSec utilization insights and Secure Vector Routing (SVR) utilization insights can help understand the amount of traffic sent over IPSec tunnels versus local breakout, where IPSec tunnels or SVR session-based routing are in use, respectively. WAN insights also provide application visibility on a per user as well as per app basis. In combination with the tenant information and session-aware router capabilities described above, WAN insights can provide application visibility on a per tenant, per application basis.

In operation, NMS 136 observes, collects and/or receives event data, which may take the form of data extracted from messages, counters and statistics, for example. NMS 136 may comprise one or more computing devices, dedicated servers, virtual machines, containers, services or other forms of environments for performing the techniques described herein. Similarly, computational resources and components implementing virtual network assistant (VNA) 133 and proactive analytics and correlations engine (PACE) 135 may be part of the NMS 136, may execute on other servers or execution environments, or may be distributed to nodes within a network (e.g., routers, switches, controllers, gateways and the like).

To ensure a high Service Level Experience (SLE), NMS 136 employs methods to detect faults in real-time and to even predictively detect faults before a user notices the fault(s). These methods may also be used for ensuring a particular level of application quality of experience (AppQoE).

Example fault detection systems having aspects that may be employed by NMS 136 are described in U.S. Pat. No. 10,958,585, entitled "METHODS AND APPARATUS FOR FACILITATING FAULT DETECTION AND/OR PREDICTIVE FAULT DETECTION," issued on Mar. 23, 2021; U.S. Pat. No. 9,832,082, entitled "MONITORING WIRELESS ACCESS POINT EVENTS," issued on Nov. 28, 2017; U.S. Pat. No. 10,958,537, entitled "METHOD FOR SPATIO-TEMPORAL MONITORING," issued on Mar. 23, 2021; and U.S. Pat. No. 10,985,969, entitled "SYSTEMS AND METHODS FOR A VIRTUAL NETWORK ASSISTANT," issued on Apr. 20, 2021, the entire contents of each of which are incorporated by reference herein.

In some examples, VNA 133 of NMS 136 may apply machine learning techniques to identify the root cause of error conditions detected or predicted from the streams of event data. If the root cause may be automatically resolved, VNA 133 invokes one or more corrective actions to correct the root cause of the error condition, thus automatically improving the underlying SLE metrics and also automatically improving the user experience. Further example details of root cause analysis and automatic correction techniques that may be performed by NMS 136 are described in U.S. patent application Ser. No. 17/303,222, entitled "VIRTUAL NETWORK ASSISTANT HAVING PROACTIVE ANALYTICS AND CORRELATION ENGINE USING UNSUPERVISED ML MODEL," filed May 24, 2021, 2021, the entire contents of which are incorporated by reference herein.

Although the onboarding and registration techniques of the present disclosure are described in this example as performed by NMS 136 of cloud-based WAN assurance system 130, techniques described herein may be performed by any other computing device(s), system(s), and/or server (s), including for purposes other than WAN assurance, and this disclosure is not limited in this respect. For example, one or more computing device(s) configured to execute the functionality of the techniques of this disclosure may reside in a dedicated server or be included in any other server in addition to or other than cloud-based WAN assurance system 130, or may be distributed throughout network system 100, and may or may not form a part of cloud-based WAN assurance system 130.

In some examples, network devices 110 (e.g., routers or switches) or even access points (not shown) may be configured to locally construct, train, apply and retrain unsupervised ML model(s) based on locally collected SLE metrics to determine whether the collected network event data should be discarded or whether the data represents anomalous behavior that needs to be forwarded to NMS 136 for further root cause analysis by a virtual network assistant (FIG. 2) to facilitate identification and resolution of faults.

As illustrated in FIG. 2, the following steps are performed to onboard network device 110N to cloud-based WAN assurance system 130, which correspond to the numbered arrows in FIG. 2:

Step 1: The administrator obtains a unique organization-wide registration code from the cloud-based WAN assurance portal 131. The registration code contains encoded information about the organization, and a secret key for initial secure communication with the cloud-based WAN assurance system 130 among other information. The registration code may specify which API endpoint needs to be accessed to provide the information in step 5. The secret key may be a symmetric key.

In some examples, the registration code may be sent in the form of a Token: JSON Web Token (JWT), such as with the following format, for example:

```
token = jwt.encode({
'org_id': org_id,
'svc': MxEdge.ROUTER128,
'provider': settings.DEPLOYMENT_PROVIDER,
'env': settings.DEPLOYMENT_ENV,
'epterm_url': settings.EP_TERMINATOR_URL,
```

-continued

```
'iat': issued_at,
'exp': expires_at,
}, jwt_secret)
```

Step 2: The administrator provides an input specifying the registration code to the network device conductor 120. In some examples, the administrator performs a copy/paste operation, cutting from a graphical user interface provided by a portal of the cloud-based WAN assurance system 130 and pasting into a graphical user interface provided by network device conductor 120 to input the registration code to network device conductor 120 (e.g., a Command Line Interface). This facilitates establishing the necessary trust between the cloud backend and network device conductor 120. A zero-trust onboarding mechanism may already exist between network device 110N and network device conductor 120, which allows network device 110N within the organization to receive configuration and other command and control information.

Once a valid registration code is committed, registration is automatic. Network device conductor 120 sends instructions to all connected routers to self-onboard to the cloud-based WAN assurance system 130. The process is automated, and the routers do not require any user interaction.

Steps 1 and 2 are one-time steps that the administrator does for a given organization. Once steps 1 and 2 are completed, the onboarding process as described next will occur automatically for any of network devices 110 that are created for that organization.

Step 3: The administrator instructs network device conductor 120 to create a new virtualized network device such as network device 110N (e.g., on a virtual machine or container).

Step 4: Upon being created, network device 110N sends a message to network device conductor 120 and is authenticated and authorized by network device conductor 120. After network device 110N is authenticated and authorized, network device conductor 120 triggers the process of onboarding network device 110N to the cloud-based WAN assurance system 130. When authorizing network device 110N, network device conductor 120 sends a registration-code to network device 110N. The registration-code that network device conductor 120 transfers to network device 110N contains information such as: an organization identifier (org-id) of the organization to which network device 110N belongs; an URL to communicate with cloud-based WAN assurance onboarding server 132; and an initial secret-key which network device 110N can use to create a secure channel with the cloud-based WAN assurance system backend. In some examples, a cloud-based WAN assurance plugin is installed and enabled on network device conductor 120, which enables certain functionality described herein, such as triggering the process of onboarding network devices to the cloud-based WAN assurance system 130 and setting up the network device to provide data to the cloud-based WAN assurance system 130 in the expected format.

Step 5: On the first connect, network device 110N presents the cloud-based WAN assurance onboarding server 132 with the following data to uniquely identify itself for the specific organization:

org-id: The identifier of the cloud-based WAN assurance organization to which network device 110N belongs to.

conductor-id: The identifier of the network device conductor 120 managing this network device 110N.

asset-id: A unique identifier such as serial number for network device 110N being onboarded. This may have been generated and stored by network device conductor 120 upon creating network device 110N.

router-name: The user-readable device name assigned to network device 110N.

In some examples, this data, referred to as device identification data, may be sent by network device 110N in a JSON format, such as a JSON open token format.

The cloud-based WAN assurance onboarding server 132 will be able to use this data to "manufacture" a router in device data database 138. In other words, cloud-based WAN assurance onboarding server 132 uses the data received from network device 110N to generate a distinct (e.g., unique) device identifier for network device 110N in the cloud-based WAN assurance system 130 and create an object in a data structure that represents network device 110N where the object is associated with the distinct device identifier representing network device 110N in the cloud-based WAN assurance system 130. The cloud-based WAN assurance system 130 is able to trust the data received from the network device because it is provided in the particular expected format.

Step 6: Cloud-based WAN assurance onboarding server 132 provides network device 110N with the following information: device-id: A unique identifier representing network device 110N in the cloud-based WAN assurance system 130, including for use by network management system 136; secret-key: A new secret key that network device 110N can used to communicate with the cloud-based WAN assurance system 130.

Step 7: Network device 110N will securely store this information locally and use the permanent identity to then create a new secure connection 202A with cloud-based WAN assurance endpoint terminator 134 using the new secret key with the cloud-based WAN assurance system 130.

In some examples, each network device 110 that has been onboarded is displayed in an inventory page of the graphical user interface of the cloud-based WAN assurance system 130. The network devices 110 may be listed as Unassigned, and may be assigned to the appropriate site. Once the site assignment is complete, the information is relayed back to the corresponding network device 110, and the network device 110 begins streaming the telemetry data to cloud-based WAN assurance system 130.

In some examples, one or more network devices 110 can be skipped during the onboarding process. In one example, this may be done by changing authority>router>wan-assurance>enabled to false. The Conductor will then skip the network device 110 and associated nodes (if it is an HA router). For a system that has completed the onboarding process, setting "wan-assurance" to false will prevent telemetry data from being sent to the cloud.

In a situation where a network device 110 needs to be moved from one organization to another or physically relocated, the network device 110 must be released from the cloud-based WAN assurance system 130 and then re-onboarded.

Security considerations: The registration-code and the secret key can only be used for purposes of registering the device with the cloud-based WAN assurance system 130. The key does not allow for any configuration management or monitoring and has limited impact. The organization will be able to regenerate a new registration-code at any point without impacting any devices that are already registered. This prevents against any potential breach in security. Once a router is registered, the same code and registration information such as names, asset-id cannot be used for registering another device which prevents both accidental re-registration and abuse.

Figure 3:
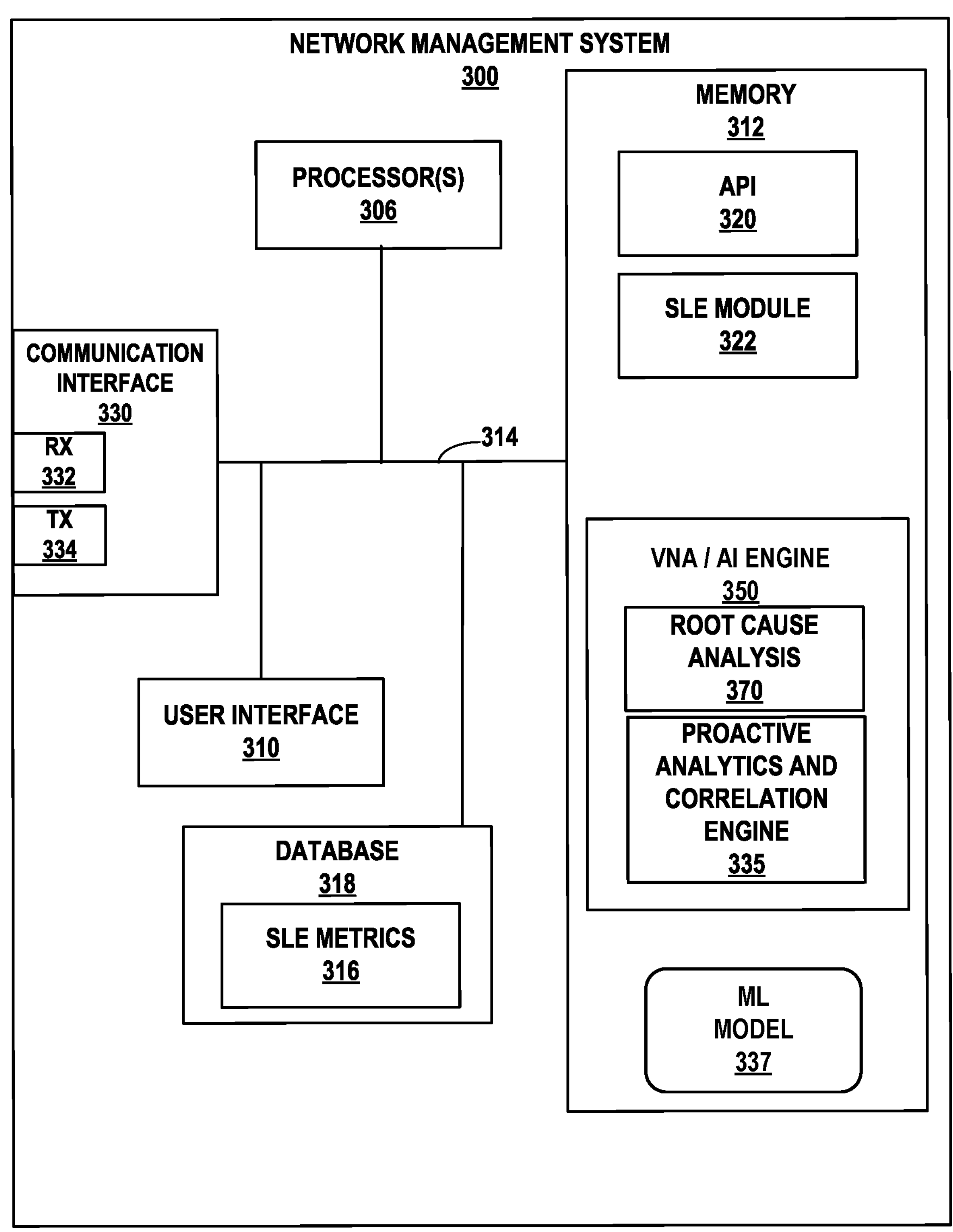
FIG. 3 is a block diagram illustrating an example network management system in accordance with the techniques of the disclosure.

FIG. 3 shows an example network management system (NMS) 300 configured in accordance with one or more techniques of this disclosure. NMS 300 may be used to implement, for example, NMS 136 in FIG. 1. In such examples, NMS 300 is responsible for monitoring and management of one or more of network devices 110A-110I of FIG. 1 of networks 102, or 110A-110N of FIG. 2. In this example, NMS 300 receives data collected from network devices 110A-110N by cloud-based WAN assurance endpoint terminator 134, such as telemetry data used to calculate one or more SLE metrics, and analyzes the telemetry data for cloud-based WAN assurance of a network containing network devices 110. In some examples, NMS 300 may be part of another server shown in FIG. 1 or a part of any other server.

In some examples, in addition to monitoring network devices 110, NMS 300 is also responsible for monitoring and management of one or more wireless networks (not shown), in addition to monitoring network devices of service provider or other networks. In this example, NMS 300 also receives data collected by access points from user equipment, such as data used to calculate one or more SLE metrics, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 102 as shown in FIG. 1, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1. The data and information received by NMS 300 may include, for example, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an Application Programming Interface (API) 220, an SLE module 322, a virtual network assistant (VNA)/AI engine 350, and a root cause analysis module 370. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

SLE module 322 enables set up and tracking of thresholds for SLE metrics for each network 102. SLE module 322 further analyzes SLE-related data collected by network devices 110, such as any of network devices 110. For example, cloud-based WAN assurance endpoint terminator (s) 134 collect SLE-related data from network devices 110 currently connected to networks 102. This data is transmitted to NMS 300, which executes by SLE module 322 to determine one or more SLE metrics for each of network devices 110 that have been onboarded to cloud-based WAN assurance system 130. The SLE metrics track whether the service level meets the configured threshold values for each SLE metric. Each metric may further include one or more classifiers. If a metric does not meet the SLE threshold, the failure may be attributed to one of the classifiers to further determine where the failure occurred. SLE metrics may include, for example, packet loss, jitter, latency, end-to-end processing time, and other user/device experience metrics such as WAN Link Health, Application Experience, and Gateway health.

VNA/AI engine 350 analyzes data received from network devices 110 as well as its own data to identify when undesired to abnormal states are encountered in one of networks 102. For example, VNA/AI engine 350 may use root cause analysis module 370 to identify the root cause of any undesired or abnormal states. In some examples, root cause analysis module 370 utilizes artificial intelligence-based techniques to help identify the root cause of any poor SLE metric(s) at one or more of networks 102. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking API 320 to reboot one or more network devices 110. The corrective actions may further include restarting a switch and/or a router, invoke downloading of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

PACE 335 of the virtual network assistant may, in some examples, dynamically construct, train, apply and retrain unsupervised ML model(s) 337 to event data (SLE metrics 316) to determine whether the collected network event data represents anomalous behavior that needs to be further analyzed by root cause analysis module 370 of VNA/AI engine 350 to facilitate identification and resolution of faults.

PACE 335 may then apply the ML model to data streams and/or logs of newly collected data of various network event types (e.g., statistics, messages, SLE metrics or the like, herein referred to as "PACE" event data of event type) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model by the proactive analytics and correlation engine to the network event data indicates that mitigation is required, NMS 300 may invoke a more complex root cause network analytics component of the virtual network assistant (VNA) to identify a root cause of the anomalous system behavior and, if possible, trigger automated or semi-automated corrective action. In this way, PACE 335 may construct and apply a ML model based on the particular complex network in which PACE 335 is deployed to determine whether to perform further, resource-intensive analysis on incoming streams of network event data collected (e.g., in real-time) from elements within the complex network system.

Further, along with identifying which issues require attention, some examples described herein may be configured to monitor messages exchanged within the complex network system as well as numerous operational counters, and statistics. During normal operation, the ratios between the values of different counters and statistics can assume values within a specific range of acceptable values, referred to herein as {Min, Max} range.

Figure 4:
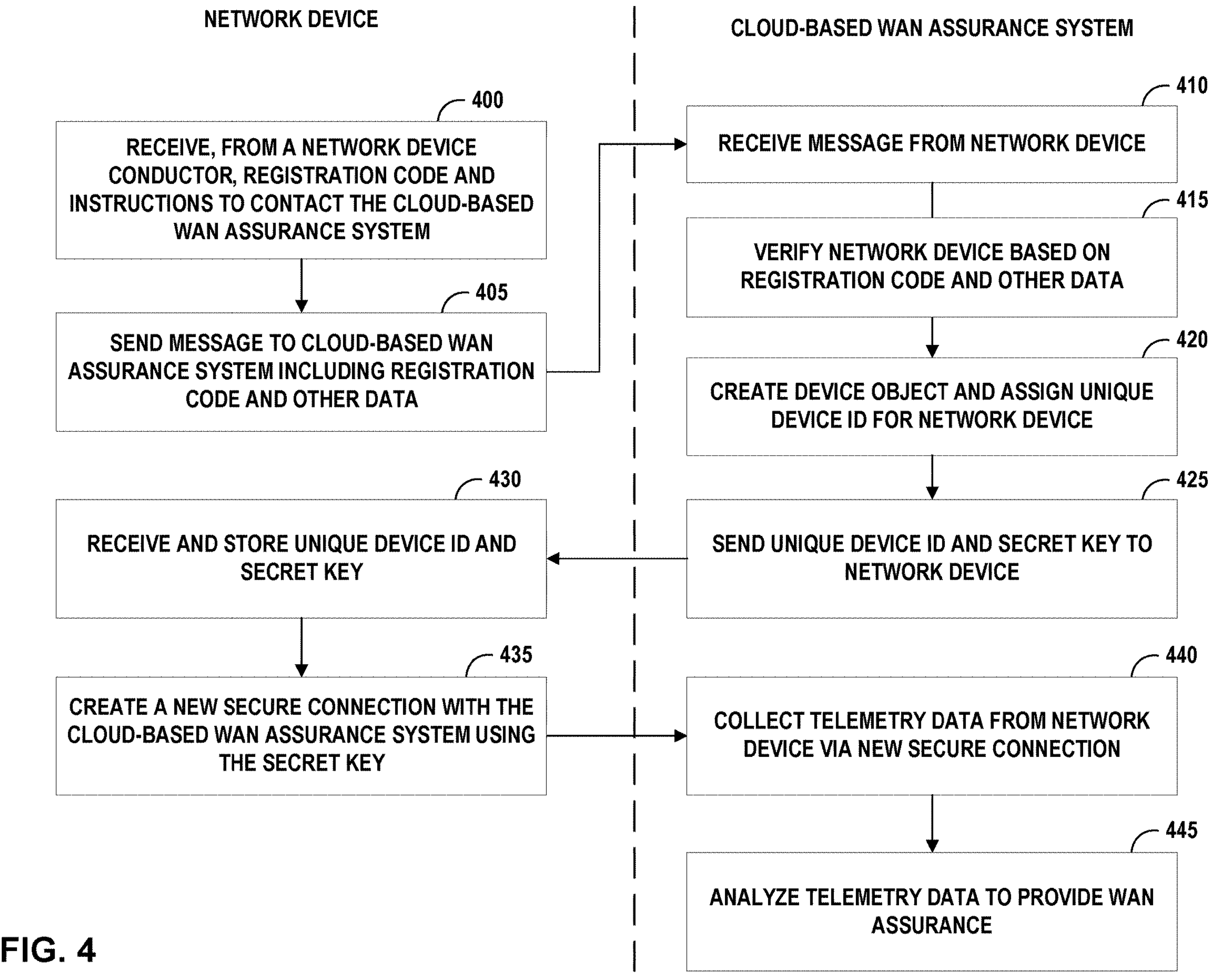
FIG. 4 is a flowchart illustrating an example operation in accordance with the techniques of the disclosure.

FIG. 4 is a flowchart illustrating an example operation in accordance with the techniques of the disclosure. Specifically, FIG. 4 depicts an example operation of a network device (e.g., a virtualized network device such as network device 110N of FIG. 2) and a cloud-based WAN assurance system (e.g., cloud-based WAN assurance system 130) for onboarding the network device to the cloud-based WAN assurance system.

The network device receives, from a network device conductor that manages a plurality of network devices, a registration code and instructions to contact the cloud-based WAN assurance system (400). In response to receiving the registration code and instructions, the network device sends a message to the cloud-based WAN assurance system. The message includes the registration code and other data, as described above (405).

The cloud-based WAN assurance system receives the message from the network device (410), and verifies the network device based on the information contained within the message, including the registration code and other data (415). If the device is verified/validated, the cloud-based WAN assurance system creates a device object for the network device and assigns a distinct (e.g., unique) device identifier to the network device (420). The cloud-based WAN assurance system sends the distinct device identifier and a secret key to the network device (425).

The network device receives and stores the distinct device identifier and a secret key (430). In some examples, the secret key is a cryptographic key for use in securely sending telemetry data to the cloud-based WAN assurance system. The network device creates a new secure connection with the cloud-based WAN assurance system, using the secret key (435). The new secure connection enables streaming of telemetry data from the network device to cloud-based WAN assurance system via the new secure connection (440). The cloud-based WAN assurance system then can analyze the telemetry data from the network device to provide WAN assurance (445). This process may be repeated for each network device created by the network conductor. In this manner, the network devices created by the network conductor are able to automatically self-register with the cloud-based WAN assurance system and will be efficiently onboarded to the cloud-based WAN assurance system without manual intervention to onboard each network device.

As a further example, a network device conductor, for a plurality of virtualized network devices configured to perform session-based routing, receives a registration code generated by a portal for a cloud-based Wide-Area Network (WAN) assurance system. The registration code includes an organization identifier and a secret key for initial communication with the cloud-based WAN assurance system. The network device conductor instantiates a first virtualized network device of the plurality of virtualized network devices, wherein the first virtualized network device is configured to perform session-based routing. The network device conductor sends the registration code to the first virtualized network device. The first virtualized network device sends to the cloud-based WAN assurance system, via a first connection to the cloud-based WAN assurance system established using the secret key, device identification data comprising the organization identifier, an identifier for the network device conductor, an identifier for a physical device executing the virtualized network device, and a name for the virtualized network device.

In response to receiving the device identification data from the first virtualized network device: the cloud-based WAN assurance system adds an entry for the first virtualized network device into a device database, and sends to the first virtualized network device a distinct (e.g., unique) identifier for the first virtualized network device and a distinct cryptographic key. The first virtualized network device stores the distinct identifier for the first virtualized network device and the cryptographic key; and sends, to the cloud-based WAN assurance system via a second connection to the cloud-based WAN assurance system established using the cryptographic key, telemetry data for the first virtualized network device.

In some examples, the cloud-based WAN assurance system associates the telemetry data for the virtualized network device with the distinct identifier for the first virtualized network device. The cloud-based WAN assurance system may apply artificial intelligence (AI)-based analytics to the telemetry data to provide WAN assurance services. For example, the cloud-based WAN assurance system can use telemetry data from the session aware SD-WAN routers to set, monitor and enforce service levels across the WAN. The cloud-based WAN assurance system may detect anomalies and provide visibility into WAN conditions that could affect people and devices using the network.

The first virtualized network device is, in some examples, configured to perform session-based routing by modifying a first packet of at least one of a forward packet flow and a reverse packet flow of a session between a source device and a destination device to include: a header comprising a source address of the first virtualized network device and a destination address of a second virtualized network device of the plurality of virtualized network devices to which the virtualized network device forwards the first packet; and a portion of metadata specifying a session identifier for the session.

The network device conductor instantiates each virtualized network device of the plurality of virtualized network devices sends the registration code and the first secret key to each of the plurality of virtualized network devices.

Moreover, the onboarding process may be repeated for each virtualized network device being onboarded. Thus, in response to receiving corresponding device identification data from each of the plurality of virtualized network devices, the cloud-based WAN assurance system adds a corresponding entry for each of the virtualized network devices into a device database; and sends to each of the virtualized network devices a different corresponding distinct identifier for the respective virtualized network device and a different corresponding distinct cryptographic key. The device identification data from each virtualized network device may, in some examples, each include the same, identical, registration code initially obtained from the cloud-based WAN assurance system. As an example, in response to receiving corresponding device identification data from each of a plurality of virtualized network devices, the cloud-based WAN assurance system: generates a distinct device identifier for each of the plurality of virtualized network devices; adds a corresponding entry for each of the virtualized network devices into a device database, wherein each of the corresponding entries includes the corresponding distinct device identifier; and sends, to each of the virtualized network devices, a different corresponding distinct identifier for the respective virtualized network device and a different corresponding distinct cryptographic key for use in sending telemetry data to the cloud-based WAN assurance system.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:

automatically registering, by a virtualized network device of a plurality of virtualized network devices of a Wide Area Network (WAN), with a cloud-based WAN assurance system using an organization-wide registration code received by the virtualized network device from a conductor device that created the virtualized network device, wherein the conductor device is external to the cloud-based WAN assurance system, wherein automatically registering comprises:

obtaining, by the virtualized network device, from a physical device executing two or more of the plurality of virtualized network devices including the virtualized network device, an identifier of the physical device, wherein the physical device is separate and distinct from the conductor device;

sending, by the virtualized network device and to the cloud-based WAN assurance system based on receiving the registration code, identification data that includes: (1) an organization identifier from the registration code and associated with the cloud-based WAN assurance system, (2) an identifier for the conductor device, wherein the identifier for the conductor device is not obtained from the registration code, and (3) the identifier for the physical device;

receiving, by the virtualized network device and from the cloud-based WAN assurance system, a distinct identifier for the virtualized network device, generated by the cloud-based WAN assurance system in response to receiving the identification data and based on at least a portion of the identification data, wherein the distinct identifier for the virtualized network device distinguishes the virtualized network device from any of the plurality of virtualized network devices executed by the physical device; and sending, by the virtualized network device and subsequent to the registering, to the cloud-based WAN assurance system, telemetry data to be associated with the distinct identifier for the virtualized network device.

2. The method of claim 1, further comprising:

receiving, from the cloud-based WAN assurance system and based on at least some of the identification data, a secret key for creating a secure connection between the virtualized network device and the cloud-based WAN assurance system.

3. The method of claim 1, further comprising:

receiving, by the virtualized network device and from the conductor device, a secret key;

sending, by the virtualized network device and to the cloud-based WAN assurance system via a first connection to the cloud-based WAN assurance system established using the secret key, the identification data; and receiving, by the virtualized network device and from the cloud-based WAN assurance system via the first connection, the distinct identifier for the virtualized network device and a cryptographic key for use in securely sending the telemetry data.

4. The method of claim 3, further comprising:

creating, by the virtualized network device, a secure connection with the cloud-based WAN assurance system using the cryptographic key, wherein sending the telemetry data comprises sending the telemetry data to the cloud-based WAN assurance system via the secure connection.

5. The method of claim 1, wherein the virtualized network device is configured to perform session-based routing by modifying a first packet of at least one of a forward packet flow and a reverse packet flow of a session between a source device and a destination device to include:

a header comprising a source address of the virtualized network device and a destination address of a second virtualized network device of the plurality of virtualized network devices to which the virtualized network device forwards the first packet; and a portion of metadata specifying a session identifier for the session.

6. The method of claim 1, further comprising:

receiving, by each of the plurality of virtualized network devices from the conductor device, the registration code, wherein the registration code is the same for each of the virtualized network devices, wherein automatically registering with the cloud-based WAN assurance system comprises automatically registering, by each of the plurality of virtualized network devices, with the cloud-based WAN assurance system using the registration code received by each of the plurality of virtualized network devices from the conductor device, and wherein sending the telemetry data to the cloud-based WAN assurance system comprises sending, by each of the plurality of virtualized network devices, corresponding telemetry data to the cloud-based WAN assurance system.

7. A method comprising:

receiving, by a conductor device for a plurality of virtualized network devices configured to perform session-based routing, an organization-wide registration code generated by a cloud-based Wide-Area Network (WAN) assurance system and comprising an organization identifier associated with the cloud-based WAN assurance system;

instantiating, by the conductor device, a first virtualized network device of the plurality of virtualized network devices;

sending, by the conductor device and to the first virtualized network device, the registration code;

obtaining, by the first virtualized network device, from a physical device executing two or more of the plurality of virtualized network devices including the first virtualized network device, an identifier of the physical device, wherein the physical device is separate and distinct from the conductor device;

sending, by the first virtualized network device and to the cloud-based WAN assurance system, identification data comprising: (1) the organization identifier from the registration code, (2) an identifier for the conductor device, wherein the identifier for the conductor device is not obtained from the registration code, and (3) the identifier for the physical device; and based on receiving the identification data from the first virtualized network device:

adding, by the cloud-based WAN assurance system, an entry for the first virtualized network device into a device database;

sending, by the cloud-based WAN assurance system and to the first virtualized network device via a first connection, a distinct identifier for the first virtualized network device and a cryptographic key, wherein the cloud-based WAN assurance system generates the distinct identifier for the first virtualized network device based at least in part on the organization identifier, the identifier of the conductor device, and the identifier for the physical device executing the first virtualized network device, wherein the distinct identifier for the first virtualized network device distinguishes the first virtualized network device from any of the plurality of virtualized network devices executed by the physical device; and sending, by the first virtualized network device and to the cloud-based WAN assurance system via a second connection to the cloud-based WAN assurance system established using the cryptographic key, telemetry data for the first virtualized network device to be associated with the distinct identifier for the virtualized network device.

8. The method of claim 7, further comprising associating, by the cloud-based WAN assurance system, the telemetry data for the virtualized network device with the distinct identifier for the first virtualized network device.

9. The method of claim 8, further comprising applying, by the cloud-based WAN assurance system and to the telemetry data, artificial intelligence (AI)-based analytics to provide WAN assurance services.

10. The method of claim 7, wherein the first virtualized network device is configured to perform session-based routing by modifying a first packet of at least one of a forward packet flow and a reverse packet flow of a session between a source device and a destination device to include:

a header comprising a source address of the first virtualized network device and a destination address of a second virtualized network device of the plurality of virtualized network devices to which the virtualized network device forwards the first packet; and a portion of metadata specifying a session identifier for the session.

11. The method of claim 7, further comprising instantiating, by the conductor device, each virtualized network device of the plurality of virtualized network devices; and sending, by the conductor device and to each of the plurality of virtualized network devices, the registration code and the secret key.

12. The method of claim 11, further comprising: in response to receiving corresponding identification data from each of the plurality of virtualized network devices:

generating a corresponding distinct device identifier for each of the plurality of virtualized network devices;

adding, by the cloud-based WAN assurance system, a corresponding entry for each of the virtualized network devices into a device database, wherein each of the corresponding entries includes the corresponding distinct device identifier; and sending, by the cloud-based WAN assurance system and to each of the virtualized network devices, the corresponding distinct identifier for the virtualized network device and a corresponding distinct cryptographic key for use in securely sending telemetry data to the cloud-based WAN assurance system.

13. The method of claim 11, wherein the registration code is generated by a portal for the cloud-based WAN assurance system, the registration code further comprising a secret key for initial communication with the cloud-based WAN assurance system, and wherein sending the identification data comprises sending the identification data via a first connection to the cloud-based WAN assurance system established using the secret key.

14. A method comprising:

based on receiving corresponding identification data from each of a plurality of virtualized network devices created by a conductor device, generating, by a cloud-based Wide Area Network (WAN) assurance system, a corresponding distinct identifier for use in identifying each of the plurality of virtualized network devices in the cloud-based WAN assurance system, wherein the corresponding identification data from each of the plurality of virtualized network devices includes: (1) an organization identifier obtained from a registration code associated with the cloud-based WAN assurance system, (2) an identifier for the conductor device that is not obtained from the registration code, and (3) an identifier for a physical device executing the virtualized network device, the identifier for the physical device having been obtained by the virtualized network device from the physical device, wherein the physical device executes two or more of the plurality of virtualized network devices including the virtualized network device, wherein the physical device is separate and distinct from the conductor device;

adding, by the cloud-based WAN assurance system, a corresponding entry for each of the virtualized network devices into a device database, wherein each of the corresponding entries includes the corresponding distinct identifier and at least some of the identification data, and wherein the distinct identifier for the virtualized network device distinguishes the virtualized network device from any of the plurality of virtualized network devices executed by the physical device;

sending, by the cloud-based WAN assurance system and to each of the virtualized network devices, the corresponding distinct identifier for the virtualized network device and a corresponding distinct cryptographic key for use in sending telemetry data to the cloud-based WAN assurance system; and receiving, by the cloud-based WAN assurance system and from a first virtualized network device of the plurality of virtualized network devices, via a connection established using the corresponding distinct cryptographic key sent to the first virtualized network device, telemetry data for the first virtualized network device.

15. The method of claim 14, wherein the same registration code is provided for each of the plurality of virtualized network devices.

16. The method of claim 14, further comprising:

associating, by the cloud-based WAN assurance system, the telemetry data received from the first virtualized network device of the plurality of virtualized network devices with the distinct identifier for the first virtualized network device; and applying, by the cloud-based WAN assurance system and to the telemetry data, artificial intelligence (AI)-based analytics to provide WAN assurance services.

17. The method of claim 14, wherein the first virtualized network device is configured to perform session-based routing by modifying a first packet of at least one of a forward packet flow and a reverse packet flow of a session between a source device and a destination device to include:

a header comprising a source address of the first virtualized network device and a destination address of a second virtualized network device of the plurality of virtualized network devices to which the first virtualized network device forwards the first packet; and a portion of metadata specifying a session identifier for the session.

18. The method of claim 7, wherein the identification data further comprises (4) a name for the first virtualized network device, the method further comprising:

subsequent to adding the entry for the first virtualized network device into the device database, outputting, by the cloud-based WAN assurance system and for display via a graphical user interface, an inventory view of a network, wherein the inventory view includes the name for the first virtualized network device included in the identification data for the virtualized network device, wherein the name is obtained from the entry in the device database.

19. The method of claim 14, wherein the identification data further comprises (4) a name for the corresponding virtualized network device, the method further comprising:

subsequent to adding the corresponding entry for each of the virtualized network devices into the device database, outputting, by the cloud-based WAN assurance system and for display via a graphical user interface, an inventory view of a network, wherein the inventory view includes the name for each virtualized network device included in the corresponding identification data for each of the virtualized network devices for which a distinct device identifier was generated.

20. The method of claim 1, wherein the identification data further comprises (4) a name for the virtualized network device.

* * * * *